3,249,606
PROCESS OF PREPARING BETA-AMINO-ARYL-
ETHYLKETONE PICRATES
Giovanni Pellegrini, Milan, Italy, assignor to Monte-
catini Societa Generale per l'Industria Mineraria e
Chimica, Milan, Italy
No Drawing. Filed June 10, 1963, Ser. No. 286,500
Claims priority, application Italy, June 11, 1962,
11,674/62
4 Claims. (Cl. 260—247.7)

My invention relates to an improved process for the preparation of beta-amino-arylethylketone picrates.

Copending applications Serial No. 105,277 and Serial No. 228,757, filed respectively April 25, 1961 and October 5, 1962, disclose the importance of beta-amino-arylethylketone picrates for the control of crops against pathogenic agents belonging to the vegetal kingdom (fungi, bacteria) through preventive sporicidal action by contact or fumigation.

The compounds are of the formula:

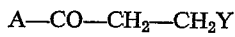

$$A—CO—CH_2—CH_2Y$$

wherein A is a simple or substituted aryl group and Y is a simple or substituted amino group, salified with picric acid. They have hitherto been prepared in the two distinct steps of (a) preparing the beta-amino-arylethyl-ketone hydrochloride by the Mannich synthesis from methyl-arylketone, hydrochloride of the amine and formaldehyde, and (b) precipitating the picrate by addition of picric acid to the hydrochloride solution. The process, based on two successive reactions, is extremely variable and gives only moderate yields while requiring large volumes of solvents and a long series of time-consuming operations.

Moreover, although it is known that in some particular cases the use of aqueous solutions of formaldehyde is advisable, the reaction is generally promoted by an anhydrous medium and by removal of water of condensation during the reaction. Improvements of the Mannich process have been based on the removal of water by distillation (S. Winstein et al., J. Org. Chem., 11, 218 (1946).

I have found that these beta-amino-arylethylketone picrates may be obtained by direct synthesis, while operating under suitable conditions, with higher yields, in a simpler manner, by reacting a methylarylketone, an amine salt (generally hydrochloride), formaldehyde and picric acid, in a single step.

The obtainment of beta-amino-arylethylketone picrates in this manner is surprising, inasmuch as it was expected that the picric acid would react quantitatively with the methylarylketone, as occurs when these two substances only are allowed to react each other, thereby preventing it from reacting with the amine salt and formaldehyde according to the classical Mannich scheme.

The reaction according to my invention takes place in the presence of solvents or mixtures thereof, which are able to display a high solvent power toward the reactant substances and which have, as a characteristic of essential significance, a boiling point not lower than 85° C. under atmospheric pressure. Obviously, when working at pressure higher than atmospheric, solvents may be employed which under atmospheric pressure show a boiling point less than the above mentioned value, whereas when operating under vacuum solvents employed may have a higher boiling point at atmospheric pressure. In the method of my invention, the temperature is of fundamental importance. A quantitative formation of methyl-arylketone picrate occurs when operating at a temperature sufficient for the picric acid dissolution and particularly at about 70° C., under the experimental conditions mentioned in the following examples. In the range between 70° and 85° C., the reaction yields increasing amounts of the beta-amino-arylethylketone picrate with increasing temperatures, to give the highest yield at temperatures generally higher than 85° C.

It has been found in particular that hydroalcoholic mixtures may be employed as the solvents. These mixtures should contain alcohol and water in such proportions as to keep the reaction mixture at a temperature above 85° C. for the whole reaction time, in order to obtain the maximum of yields.

The hydroalcoholic mixtures are preferred because alcohol, which constitutes already a component of the reaction mixture, is added at the end of the reaction to promote the precipitation of the product; the hydroalcoholic mixtures allow or promote the formation of the amine hydrochloride directly in the synthesis reactor; and they are readily available.

The possibility of operating in aqueous medium is another advantage of my process. In fact, according to my process there is no need to previously prepare the anhydrous amine hydrochloride. On the contrary, the amine hydrochloride may be prepared directly in the synthesis reactor, either by passing gaseous hydrochloric acid into a solution of the free amine or by adding aqueous concentrated HCl solution to the reaction solution itself, whereby the preparation process is remarkably simplified, especially when it is operated on industrial scale. In some cases, yellow small crystals of the final product already begin to separate during the reaction period, whereas in other cases the liquid remains clear until the end of the reaction. The picrate separation is carried out by adding to said liquid, at the end of the reaction, a suitable volume of the alcohol employed as the solvent, and by cooling. The crystalline solid product is separated by filtration or centrifugation.

Reactants are generally employed in the following preferred ratios: one mole amine hydrochloride, one mole methylarylketone, one mole picric acid and two moles and a half of formaldehyde. Under such conditions, the yields are most satisfactory. However, an increase of amine hydrochloride (see Examples 1 and 2) causes an appreciable further increase of yield. Yields have been calculated with reference to the amount of methylketone.

With respect to variation of yield as a function of the reaction temperature, the results hereinafter reported were achieved through a set of synthesis tests of the beta-morpholino ethyl-1-naphthyl ketone picrate (M. W. 498.44), wherein the temperature was the only variable factor.

100 cc. absolute ethyl alcohol, 60 cc. $H_2O$, 2 cc. concentrated HCl, 123.5 g. (1 M) morpholine hydrochloride, 170.2 g. (1 M) 1-acetonaphtone, 229.11 g. (1 M) picric acid, 75 g. (2.5 M) paraformaldehyde are poured in a 2½-liter, 3-necked flask provided with stirrer, thermometer and reflux condenser. It is heated, after agitation has started, at the various temperatures indicated hereinbelow, for 2 hours. At the end of the reaction, 600 cc.

alcohol are gradually added while cooling. The product is then filtered and dried.

TABLE I

|  | Reaction temperatures | | | |
|---|---|---|---|---|
|  | 70° C. | 80° C. | 90° C. | 100° C.[1] |
| Product, g | 400 | 444 | 440 | 442 |
| M.P., ° C | [2] 110–120 | 167–175 | 182–184 | 182–184 |

Melting point of beta-morpholino ethyl-1-naphthylketone is 186–187° C.

[1] The reaction temperature of 100° C. has been attained by operating under an overpressure of inert gas (nitrogen) of 350 mm. Hg.
[2] In this temperature range the M.P. of 1-acetonaphthone picrate (118° C.) occurs.

With regard to the influence of the amounts and ratios of solvents employed, Table II summarizes the results of synthesis tests of beta-morpholino-1-naphthylethylketone picrate, performed by repeating the above-mentioned operative conditions and employing the same amounts of reactants, but by varying the amount and ratios of solvents.

TABLE II

| Ethyl alcohol, cc | 600 | 300 | 100 | 100 | 100 | 100 | 100 | 100 |
|---|---|---|---|---|---|---|---|---|
| Water, cc |  |  |  | 20 | 40 | 50 | 60 | 90 |
| Temp., ° C | 78 | 81 | 90 | 91 | 92 | 92 | 92 | 93 |
| Product, g | 427 | 464 | 387 | 408 | 426 | 436 | 434 | 434 |
| M.P., ° C | 110–135 | 157–168 | 172–177 | 186–187 | 184–185 | 183–184 | 186–187 | 180–182 |

The following examples are to illustrate but not to restrict the present invention.

*Example 1*

100 cc. absolute ethyl alcohol, 75 cc. water, 2 cc. concentrated hydrochloric acid, 185.4 g. (1.5 M) morpholine hydrochloride, 204.6 g. (1 M) 4-chloro-1-acetonaphthone, 229.11 g. (1 M) picric acid and 75 g. (2.5 M) paraformaldehyde are poured in a 2.5-liter, 3-necked flask provided with a stirrer, thermometer and reflux condenser. Stirring is started and the flask and contents are heated under refluxing for 2 hours. The inner temperature of the flask stabilizes at 93–94° C. After 15–20 minutes, the reaction liquid becomes clear. The product separates gradually during the reaction as yellow crystals. Two hours after the reaction mixture attains the indicated temperature, 100 cc. ethyl alcohol are gradually added. Stirring is continued for about 10 minutes, the reaction mixture is then poured in a beaker and allowed to cool. By filtration, 472 g. beta-morpholino ethyl-4-chloro-1-naphthylketone picrate is obtained as yellow crystals having a melting point 182–186° C. (yield 88%).

Analysis:
    N theoretical percent, 10.51; found percent, 10.85
    Cl theoretical percent, 6.65; found percent 6.92
    C theoretical percent, 51.84; found percent, 51.50
    H theoretical percent, 3.97; found percent, 3.91

Alternatively, while obtaining identical yields, in lieu of employing previously prepared morpholine hydrochloride, the formation thereof may be achieved, while operating in analogous conditions, by passing in the flask (containing 100 cc. absolute ethyl alcohol, 77 cc. water and 130.8 g. (1.5 M) morpholine) a stream of anhydrous gaseous hydrochloric acid, until color change of Congo Red paper.

In contrast to the above yield, if beta-morpholino ethyl-4-chloro-1-naphthylkentone hydrochloride is first synthesized and subsequently precipitated with picric acid, a product is obtained showing M.P. 181–184° C. with a yield of about 43%.

*Example 2*

100 cc. absolute ethyl alcohol, 60 cc. water, 2 cc. concentrated hydrochloric acid, 123. 6 g. (1 M) morpholine hydrochloride, 204.6 g. (1 M) 4-chloro-1-acetonaphthone, 229.11 g. (1 M) picric acid and 75 g. (2.5 M) paraformaldehyde are introduced in a 2.5-liter, 3-necked flask provided with stirrer, thermometer and reflux condenser. Stirring is started and the flask and contents are heated under refluxing for 2 hours. The temperature of the reaction mixture stabilizes at 91–92° C. After 15–20 minutes the reaction liquid becomes clear. During the reaction, the product separates gradually as yellow crystals. Two hours after the reaction mixture reaches the indicated temperature, 1000 cc. ethyl alcohol are gradually added. Stirring is continued for about 10 minutes, and the reaction mixture is then poured in a beaker, allowed to cool and filtered to obtain 408 g. beta-morpholino-ethyl-4-chloro-1-naphthylketone picrate, as yellow crystals with M.P. 183–185° C. (yield 76.4%).

Analysis:
    N theoretical percent, 10.51; found percent 10.78
    Cl theoretical percent, 6.65; found percent 6.84
    C theoretical percent, 51.84; found percent 51.55
    H theoretical percent, 3.97; found percent 3.95

*Example 3*

100 cc. absolute ethyl alcohol, 75 cc. water, 2 cc. concentrated hydrochloric acid, 123.5 g. (1 M) morpholine hydrochloride, 127 g. (1 M) acetophenone, 229.11 g. (1 M) picric acid and 75 g. (2.5 M) paraformaldehyde are introduced in a 2.5-liter, 3-necked flask provided with stirrer, thermometer and reflux condenser. Stirring is started and the flask is heated under refluxing for two hours. The inner temperature is stabilized at about 92° C. Soon after the reaction begins, the liquid becomes clear and after 5 minutes the product begins to separate gradually as yellow crystals. Two hours after reaction mixture reaches the indicated temperature, 1000 cc. ethyl alcohol are gradually added. Stirring is continued for about 10 minutes, after which the reaction mixture is poured in a beaker, allowed to cool and then filtered to yield 379 g. beta-morpholino-ethyl-phenylketone picrate as yellow crystals, with M.P. 188–190° C. (yield 84.6%).

Analysis:
    N theoretical percent, 12.49; found percent, 12.60
    C theoretical percent, 50.90; found percent, 51.04
    H theoretical percent, 4.49; found percent, 4.55

When beta-morpholino ethyl-phenyl-ketone hydrochloride is first synthesized and subsequently precipitated with picric acid, a product is obtained having M.P. 187–193° C. with an approximate yield of 59%.

*Example 4*

100 cc. absolute ethyl alcohol, 75 cc. water, 2 cc. concentrated hydrochloric acid, 122.7 g. (1 M) dimethylamine hydrochloride, 127 g. (1 M) acetophenone, 229.11 g. (1 M) picric acid, and 75 g. (2.5 M) paraformaldehyde are introduced in a 2.5-liter, 3-necked flask provided with stirrer, thermometer and reflux condenser. Stirring is started and heating under refluxing is continued for 2 hours. Inner temperature stabilizes at about 93° C. Two hours after the reaction liquid reaches the indicated temperature, 1000 cc. ethyl alcohol are gradually added. Stirring is continued for about 10 minutes; the reaction mixture is then poured in a beaker, allowed to cool, and filtered to obtain 295 g. beta-dimethylamino-ethylphenylketone picrate as yellow crystals with M.P. 150–151° C. (yield 73.8%).

Analysis:
N theoretical percent, 13.80; found percent, 14.10
C theoretical percent, 50.24; found percent, 50.53
H theoretical percent, 4.46; found percent, 4.94

When beta-dimethylamino-ethylphenylketone hydrochloride is first synthesized and subsequently precipitated with picric acid, the product obtained has a M.P. 150–152° C. and an approximate yield of 53%.

Example 5

100 cc. absolute ethyl alcohol, 75 cc. water, 2 cc. concentrated hydrochloric acid, 123.5 g. (1 M) morpholine hydrochloride, 170.2 g. (1 M) 1-acetonaphthone, 229.11 g. (1 M) picric acid, 75 g. (2.5 M) paraformaldehyde are introduced in a 2.5-liter, 3-necked flask, provided with stirrer, thermometer and reflux condenser. Stirring is started and the flask and contents are heated under refluxing for two hours. The inner temperature stabilizes at about 92° C. Two hours after the inner liquid reaches the indicated temperature, 1000 cc. ethyl alcohol are gradually added. Stirring is continued for about 10 minutes, then the reaction mixture is poured into a beaker, is allowed to cool and filtered to obtain 450 g. beta-morpholino-ethyl-1-naphthylketone picrate as yellow crystals with a M.P. 180–184° C. (yield 90.2%).

Analysis:
N theoretical percent, 11.24; found percent, 11.49
C theoretical percent, 55.42; found percent, 55.24
H theoretical percent, 4.45; found percent, 4.67

When first synthesizing beta-morpholinoethyl-1-naphthylketone hydrochloride and subsequently precipitating it with picric acid, the product obtained has a M.P. 186–187° C. and an approximate yield of 48%.

Example 6

100 cc. absolute ethyl alcohol, 60 cc. water, 2 cc. concentrated hydrochloric acid, 123.5 g. (1 M) morpholine hydrochloride, 170.2 g. (1 M) 1-acetonaphthone, 229.11 g. (1 M) picric acid, 75 g. (2.5 M) formaldehyde are introduced in a 2.5-liter, 3-necked flask provided with stirrer, thermometer and reflux condenser. Stirring is started and the flask and contents are heated to maintain, for the whole duration of reaction (2 hours), the temperature at 100° C. This temperature is obtained by operating at an overpressure of inert gas (nitrogen) of 350 mm. Hg. Two hours after the reaction mixture has reached the mentioned temperature, 600 cc. ethyl alcohol are added while cooling. The product is filtered off and dried to give 442 g. beta-morpholino-1-naphthylketone picrate with a M.P. 182–184° C. (yield 88.6%).

Analysis:
N theoretical percent, 11.24; found percent 11.40
C theoretical percent, 55.42; found percent, 55.08
H theoretical percent, 4.45; found percent, 4.47

Example 7

100 cc. absolute ethyl alcohol, 75 cc. water, 2 cc. concentrated hydrochloric acid, 122.7 g. (1 M) dimethylamine hydrochloride, 172 g. (1 M) acetonaphthone, 229.11 g. (1 M) picric acid and 75 g. (2.5 M) paraformaldehyde are introduced in a 2.5-liter, 3-necked flask provided with stirrer, thermometer and reflux condenser. Stirring is started and the flask and contents are heated under refluxing for 2 hours. The inner temperature stabilizes at about 94° C. 35 minutes after the reaction begins the liquid becomes clear and remains so till the end. Two hours after the reaction liquid has reached the indicated temperature, 1000 cc. ethyl alcohol are gradually added. Stirring is continued for about 10 minutes, the mixture is then poured in a beaker, allowed to cool and filtered to obtain 385 g. beta-dimethylaminoethyl-1-naphthylketone picrate, as yellow crystals with a M.P. 170–173° C. (yield 84.4%).

Analysis:
N theoretical percent, 12.27; found percent, 12.40
C theoretical percent, 54.96; found percent, 55.26
H theoretical percent, 4.41; found percent, 4.42

On the contrary, when first synthesizing the beta-dimethyl-amino-ethyl-naphthylketone hydrochloride and thereafter precipitating with picric acid, the product obtained shows a M.P. 174–174.5° C. and an approximate yield of 48%.

Example 8

100 cc. absolute ethyl alcohol, 75 cc. water, 2 cc. concentrated hydrochloric acid, 122.7 g. (1 M) dimethylamine hydrochloride, 204.6 g. (1 M) 4-chloro-acetonaphthone, 229.11 g. (1 M) picric acid and 75 g. (2.5 M) paramormaldehyde are introduced in a 2.5-liter, 3-necked flask provided with stirrer, thermometer and reflux condenser. Stirring is started and the flask and contents are heated under refluxing for two hours. The inner temperature stabilizes at about 94° C. Two hours after the reaction liquid reaches the indicated temperature, 1000 cc. ethyl alcohol are gradually added. Stirring is continued for about 10 minutes; thereafter the reaction mixture is poured in a beaker, allowed to cool and filtered to obtain 377 g. beta-dimethylaminoethyl - 4 - chloro - 1 - naphthylketone picrate as yellow crystals with a M.P. 155–157° C. (yield 76.8%).

Analysis:
N theoretical percent, 11.41; found percent, 11.51
Cl theoretical percent, 7.22; found percent, 7.13
C theoretical percent, 51.39; found percent, 51.85
H theoretical percent, 3.90; found percent, 3.97

On the contrary, when first synthesizing the beta-dimethylamino-4-chloro-1-naphthylketone hydrochloride and subsequently precipitating it with picric acid, a product is obtained showing a M.P. 157–161° C., with an approximate yield of 23%.

Example 9

100 cc. absolute alcohol, 75 cc. water, 2 cc. concentrated hydrochloric acid, 136 g. (1 M) di-N-propylamine hydrochloride, 170 g. (1 M) 1-acetonaphthone, 229.11 g. (1%) picric acid, 75 g. (2.5 M) paraformaldehyde are introduced into a 2.5-liter, 3-necked flask, provided with stirrer, thermometer and reflux condenser. Stirring is started under refluxing for two hours. The inner temperature stabilizes at about 94° C. Two hours after the inner liquid has reached the indicated temperature, 1000 cc. ethyl alcohol are gradually added. Stirring is continued for about 10 minutes, the reaction mixture is then poured in a beaker, allowed to cool and filtered to obtain 362 g. beta-di-N-propylamine-ethyl-1-naphthylketone picrate as yellow crystals with a M.P. 132–132.5° C. (yield 70.6%).

Analysis:
N theoretical percent, 10.93; found percent, 11.02
C theoretical percent, 58.60; found percent, 58.58
H theoretical percent, 5.57; found percent, 5.51

Hydrochloride synthesis, according to the original method of Mannish, affords no results in the specific case. If, on the other hand, beta-di-N-propylamine-ethyl-1-naphthylketone is first prepared according to Winstein et al. (Journ. Org. Chem. 11, 1946, 218) and then picric acid is added, a product is obtained showing M.P. 129–130° C., with an approximate yield of 25%.

Example 10

125 g. of n-propyl alcohol, 47 cc. of water, 1cc. of concentrated hydrochloric acid, 61.8 g. (0.5 mol) of morpholine hydrochloride, 125 g. (0.61 mol) of 4-chloro-1-acetonaphthone, 114.55 g. (0.5 mol) of picric acid and 37.5 g.

(1.25 mols) of paraformaldehyde are introduced into a 1-liter, 3-necked flask provided with an agitator, thermometer and reflux condenser. Agitation is started and the whole is refluxed for 5 hours (inner temperature 93° C.). After 15-20 minutes, the reaction liquid becomes clear. The product gradually separates during the reaction as yellow crystals. Three hours after the reaction liquid has reached the above-mentioned temperature, 200 cc. of ethanol are gradually added. Agitation is continued for 10 additional minutes and the reaction mixture is then poured in a beaker and is left to cool. By filtration, 212 g. of beta-morpholinoethyl-4-chloro-1-naphthylketone picrate, melting point 185–187° C., are obtained (yield with respect to 4-chloro-1-acetonaphthone=65%).

*Example 11*

125 cc. of n-amyl alcohol, 34 g. of water, 1 cc. of concentrated hydrochloric acid, 61.8 g. (0.5 mol) of morpholine hydrochloride, 125 g. (0.61 mol) of 4-chloro-1-acetonaphthone, 114.55 g. (0.5 mol) of picric acid and 37.5 g. (1.25 mols) of paraformaldehyde are placed in a 1-liter, 3-necked flask provided with an agitator, a thermometer and a reflux condenser. Agitation is started and the reaction mixture is refluxed for 2 hours (inner temperature 101° C.). After a few minutes, the reaction liquid becomes clear. The product gradually separates during the reaction in the form of yellow crystals. Two hours after the reaction liquid has reached the above temperature, 200 cc. of n-amyl alcohol are gradually added. Agitation is continued for 10 additional minutes and the reaction mixture is then poured into a beaker and left to cool. By filtration, 210 g. of beta-morpholino-ethyl-4-chloro-1-naphthylketone picrate, melting point 176–180° C., are obtained (yield 64.4% with respect to 4-chloro-1-acetonaphthone).

I claim:

1. A process for preparing picrates of beta-amino-arylethylketones, which comprises reacting in a single operative step a methylarylketone, formaldehyde, an amine hydrochloride and picric acid, at a temperature of at least 85° C., in the presence of a solvent.

2. A process for preparing picrates of beta-amino-arylethylketones, which comprises reacting in a single operative step a methylarylketone, paraformaldehyde, an amine hydrochloride and picric acid, at a temperature of at least 85° C., in the presence of a solvent.

3. A process for preparing picrates of beta-amino-arylethylketones, which comprises reacting in a single operative step a methylarylketone, paraformaldehyde, an amine hydrochloride and picric acid, at a temperature of at least 85° C., in the presence of a water-alcohol solvent.

4. A process for preparing picrates of beta-amino-arylehtylketones of the formula

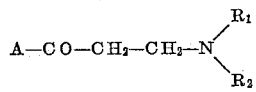

wherein A is aryl selected from the group consisting of simple and substituted phenyl, naphthyl and anthranyl, in which the substituents are selected from the group consisting of hydroxyl, halo, nitro, alkyl and alkoxy, and $R_1$ and $R_2$ are each selected from the group consisting of hydrogen, lower alkyl, and together with nitrogen can form a heterocyclic group selected from those consisting of morpholino and piperidino, which comprises reacting in a single operative step a methylarylketone, paraformaldehyde, an amine hydrochloride and picric acid, at a temperature of at least 85° C., in the presence of a water-ethyl alcohol solvent.

References Cited by the Examiner

UNITED STATES PATENTS 3,058,987  10/1962  Albrecht et al. _____ 260—570.6

OTHER REFERENCES

Harradence et al.: Chem. Abst., vol. 33, col. 5855 and 5856 (1939).

Migrdichian, Organic Synthesis, vol. I, pages 157–162 (1957).

Noller Chemistry of Organic Compounds, 2nd ed., pages 460–461 (1957).

WALTER A. MODANCE, *Primary Examiner.*

NICHOLAS RIZZO, *Examiner.*